United States Patent [19]

Pellegrino

[11] 4,344,655
[45] Aug. 17, 1982

[54] TWO-PART MOULDED WHEEL MADE OF PLASTIC MATERIAL FOR CHILDREN'S VEHICLE

[76] Inventor: Giuseppe Pellegrino, Via Luca Giordano, 142-Napoli (I), Italy

[21] Appl. No.: 168,182

[22] Filed: Jul. 10, 1980

[30] Foreign Application Priority Data

Jan. 11, 1979 [IT] Italy ............................ 47588 A/79

[51] Int. Cl.³ .......................................... B60B 37/00
[52] U.S. Cl. .............................. 301/2.5; 301/63 PW; 74/594.1
[58] Field of Search .................. 301/1, 2.5, 7, 63 PW; 280/259, 249; 74/594.1

[56] References Cited

U.S. PATENT DOCUMENTS 1,541,490  6/1925  Ferris ............................... 301/2.5
2,787,970  4/1957  Bennett ............................ 280/259

FOREIGN PATENT DOCUMENTS 628786  10/1961  Canada ........................... 301/63 PW

*Primary Examiner*—H. Grant Skaggs
*Attorney, Agent, or Firm*—Wigman & Cohen

[57] ABSTRACT

A moulded wheel made of plastic material for children's vehicle with pedal-driven wheels, consisting of two identical half-wheels (1a, 1b) separated by the symmetry plane perpendicular to the axis of the wheel and formed by a shell element produced by only one moulding process and by means of only one die and back draft, and including a hollow, peripheral tire portion (2) which has a semicircular radial section and is connected to a central disc portion (3) from which a short, hollow shaft (4) projects outwards and is integrated with a box-like radial arm (5) integrated in turn at its external end with a sleeve (6) which is provided with a hole (6a) having an axis parallel to the axis of the wheel, and in which the hollow shaft (7) of the pedal crank (8) is fitted, from the internal face of each half-wheel (1a, 1b) at least one guide pin (10) and one guide seat (11) projecting at positions diametrically symmetric with respect to the axis of the wheel and at least one fixing pin (12) and one housing (13) projecting at diametrically opposed positions.

4 Claims, 5 Drawing Figures

TWO-PART MOULDED WHEEL MADE OF PLASTIC MATERIAL FOR CHILDREN'S VEHICLE

The present invention relates to a moulded wheel consisting of two identical parts made of plastic material which can be jointed by fitting elastically deformable grip means. The two parts of the wheel are also both provided with a support arm for the relative wheel driving pedal crank which can be also manufactured in one piece through a moulding process.

It is already known wheels made of plastic material to provide toys mounted on wheels such as tricycles, hobby-horses or the like which are ridden by the children by means of pedals mounted on the driving and steering wheels. The known types of wheels for such toys are expensive to manufacture both for the large number of dies necessary for the moulding of the various parts and for the construction system which requires the use of pins screws, washers and the like.

The present invention can be used to provide an ample and strong unit which can be easily assembled and which is totally made of plastic material. In this way its parts cannot rust or lose their colour.

The particular characteristics of such a wheel are the following:

1. Possibility of moulding the wheel in two parts identical to each other produced by means of only one die in only one moulding process, through which also the guide means and the means of connecting the two parts as well as the support arm for the shaft of the relative pedal crank are obtained.
2. The pedal cranks are identical and produced by means of only one die in only one moulding process, and also include the shaft of the pedal crank which fits in by snap-locking and rotates freely in the seat provided in the body of the arm integrated with the relative half-wheel.
3. The mounting of the wheel and of the pedal crank is rapid and thanks to the guide pins and seats as well as locking means which can be deformed and blocked does not require screws or other accessories.
4. Only one die is used for the construction of the whole wheel and only one mould for the pedal cranks.
5. Pins, washers, screws and other articles of metallic carpentry are eliminated.

The enclosed drawing gives an example of an embodiment of the present invention. In the drawing.

Figure 1:
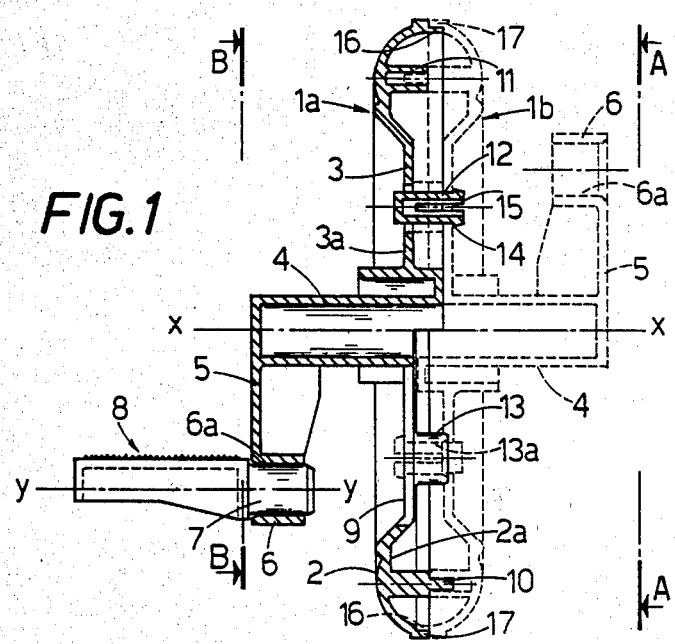
FIG. 1 is an axial section of a half-wheel through the axis of the pedal crank, while the second identical half-wheel is in dashes.
Figure 2:
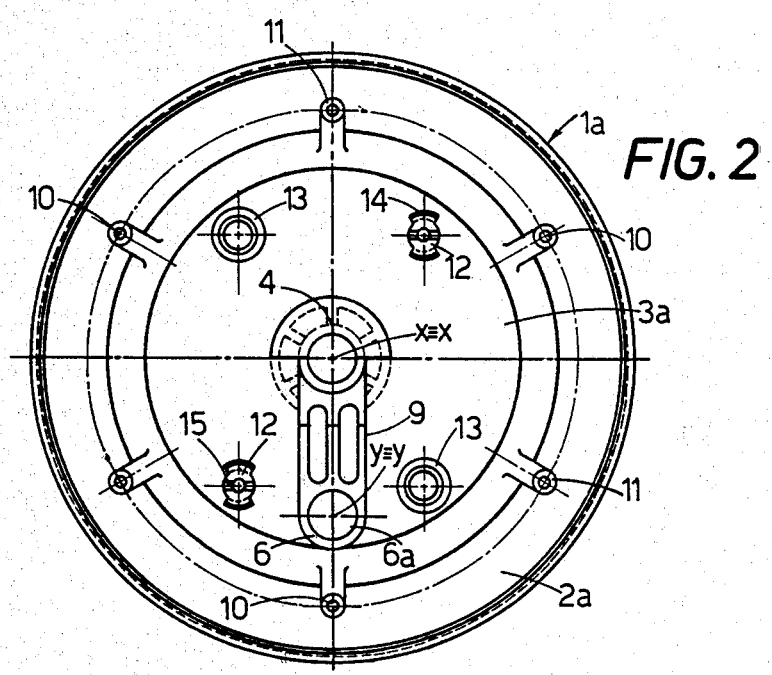
FIG. 2 is a view of the external face of the half-wheel along the line A—A of FIG. 1.
Figure 3:
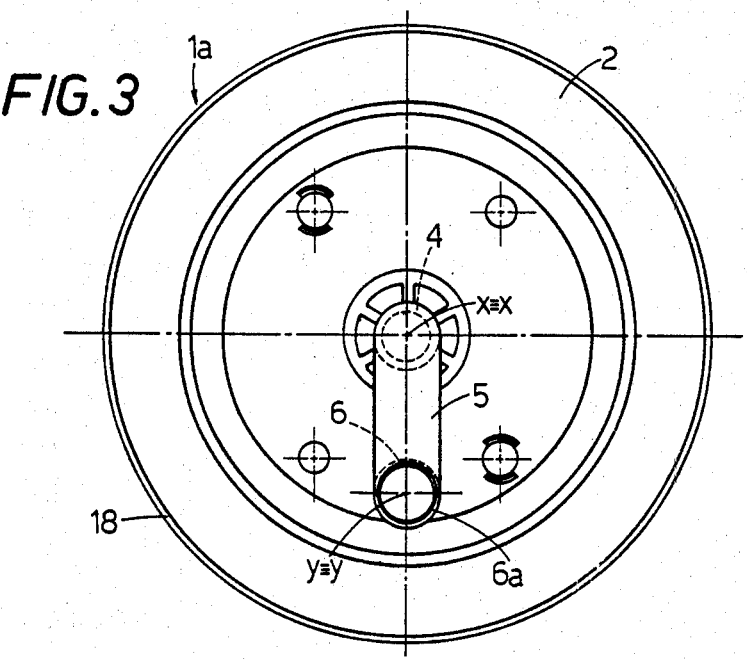
FIG. 3 is a view of the internal face of the halfwheel along the line B—B of FIG. 1.

Referring to the drawing the two half-wheels, which are marked with 1a and 1b, are perfectly identical to each other so that they can be formed with only one die. Furthermore, such a die includes only one mould and only one back draft due to the particular shape of the half-wheels 1a and 1b. As a result they can be produced through only one moulding process.

To this end both half-wheels 1a and 1b include a tread formed by a peripheral, hollow half-tire having a semi-circular section 2 which is joined to a central disc 3. The latter, at the axis X—X of the half-wheel, projects outwards in a short, hollow shaft 4 which forms the half-shaft of the wheel, from the end of which a radial arm 5 projects being provided with an U cross-section.

At the end of the radial arm a tubular sleeve 6 is formed with a drilled hole 6a which has an axis Y—Y parallel to the axis X—X of the wheel and provides a seat for the hollow shaft 7 of the pedal crank marked with 8. In order to allow the moulding of the arm 5 integrated with the sleeve 6, during the moulding process of the half-wheel 1a or 1b, the disc 3 is provided with a radial opening 9 which is complementary to the shape of the arm 5. Little pins 10, which are spaced with equal angle shift from little, hollow cylinders 11 provided with holes for receiving the little pins 10 of the other half-wheel project from the internal face of the half-wheel 1a or 1b in correspondance with the internal surface 2a of the half-tire 2.

In the illustrated embodiment three little pins and three receiving cylinders 11 alternated to each other are provided. The latter act as guide means for the mounting of the two half-wheels 1a and 1b according to the exact centering requested.

The connection of the half-wheels 1a and 1b is established through elastically deformable fixing means 12 and relevant housing means 13. Such means 12, 13 are formed in the central disc 3 of the half-wheels 1a, 1b.

Hollow sleeves 12 project from the internal face 3a of the central disc 3 of the half-wheels and provide a conical edge 14 projecting outwards. Two longitudinal slots 15 extend along the wall of each sleeve 12 thus forming between them two elastically deformable arms with conical edges 14.

Such fixing means 12 are provided in positions diametrically opposed to each other and symmetrical to the housing means 13 with respect to the axis X—X. The housing means 13 consists of bushes with cylindrical seats 13a having an internal diameter substantially equal to the external diameter of the sleeve 12. The seats 13a have such a length that the bushes 13 can engage the fixing means 12 when the two half-wheels 1a, 1b are in contact with each other. In such a position the conical edges 14 of the fixing means 12 project from the external face of the other half-wheel. In order to establish a good connection between the two half-wheels 1a and 1b, the peripheral edge of the wheel is provided on one half with an internal tongue 16, and on the other half with an external tongue 17, both axially projecting and engageable with each other.

The mounting is effected by drawing near the two half-wheels 1a and 1b to each other, inserting the little pins 10 in their seats 11 and the tongue 16 within the tongue 17 and pressing the half-wheels against each other. With this movement, the two arms of the sleeve 12 approach each other along the slots 15 and enter the seats 13a of the bushes 13 sliding inside until the edges 14 of the arms project outwards from the external face 3 of the respective half-wheels 1a, 1b. This occurs at the same time in which the peripheral edges of the half-wheels 1a, 1b come into contact with each other.

At the same time the edges 14, which are now free, assume their original positions blocking themselves against the external edges of the respective seats 13a keeping the two half-wheels 1a, 1b joined together.

The half-tire 2 of each half-wheel 1a and 1b is provided with annular slots 18 for the fittings of the bead of a tyre which covers the wheel to make it less noisy and to produce a springing effect.

When the two half-wheels 1a and 1b are coupled to each other, the wheel forms a single body from the hubs of which the arms 5 project which are in turn provided with the sleeves 6 for the pedal cranks 8.

Figure 4:
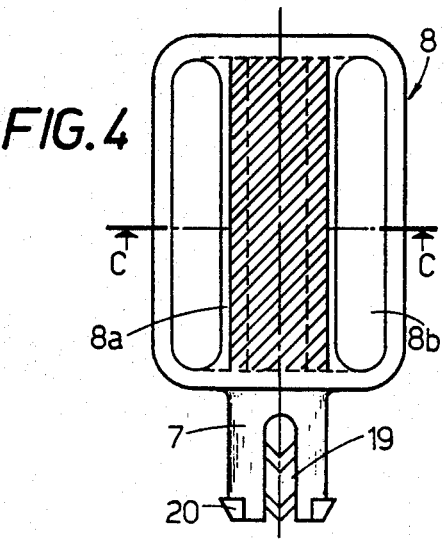
FIG. 4 is a top view of the pedal crank.
Figure 5:
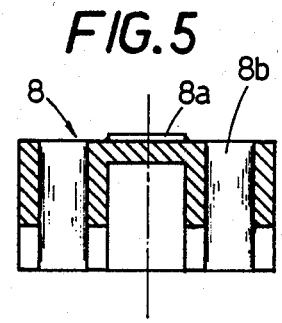
FIG. 5 is a section of the pedal crank along the line C—C of FIG. 4.

Each pedal crank 8 has a boss-line shape as shown in FIGS. 4 and 5 and includes a central rectangular plate 8a with an external knurled surface in order to make the pedalling easier, while at their sides lightening windows 8b are formed. The body of the pedal crank 8 projects in a hollow shaft 7 which is formed substantially similar to the sleeves 12 of the fixing means of the two half-wheels 1a and 1b. The hollow shaft 7 is provided with two opposing slits 19 thus forming two longitudinal arms from the ends of which the conical teeth 20 project outwards. The distance between the teeth 20 and the body of the pedal crank 8 is substantially equal to the depth of the hole 6a formed in the sleeve 6 integrated with the end of the arm 5. By pushing the shaft 7 with the conical teeth 20 within the hole 6a both halves of the shaft 7 approach each other and penetrate along the hole 6a until the teeth 20 project outwards from the latter at the opposite side thus blocking the shaft 7 and then fixing the pedal crank 8 to the arm 5 so that the pedal crank 8 is free to rotate around the axis Y—Y of the hole 6a.

What is claimed is:

1. A wheel made of plastic material for a children's vehicle with a pedal-driven wheel consisting of two half-wheels corresponding to the two halves of a shell-like wheel separated by the plane of symmetry perpendicular to the axis thereof, each half-wheel comprising:
    a hollow, peripheral semi-toroidal portion connected to a central disc portion;
    a first hollow shaft extending outwardly from said central disc portion;
    a radial arm integral with said first hollow shaft which serves as a crankshaft of the pedal crank of said pedal-driven wheel;
    the outer end of said radial arm being integral in turn with a sleeve having an axial hole parallel to the axis of said first hollow shaft;
    a second hollow shaft connected to said pedal crank which is rotatably received in said axial hole;
    said central disc portion including an opening facing said radial arm and having a shape complimentary thereto in order to permit the moulding in a single step of each semi-wheel and of all the parts connected thereto; and
    each half-wheel having an internal face from which at least one guide pin, at least one guide seat, at least one male member and at least one female member are provided, each pin and guide seat, as well as said male and female members having axes parallel to and diametrically opposed with respect to said half-wheel axis.

2. The wheel of claim 1, wherein the guide pins and the guide seats provided to receive said pins extend from the internal face of the portion of each half-wheel.

3. The wheel of claim 1, wherein the male members and the female members project from the internal face of each half-wheel, each male member being a pin having first longitudinal slits so as to be able to be radially deformed by any inwardly directed pressure and each pin having first conical teeth at its external end projecting outwards with their free ends and each respective female member consisting of a sleeve into which said pin enters and against which the free end of said conical teeth contact.

4. The wheel of claim 1, wherein said pedal crank comprises a box-like, hollow element having a cavity at its lower face in order to allow its moulding in one piece, said pedal crank being integral with said second hollow shaft and being provided at its outer end portion with second longitudinal slits separating said second hollow shaft into parallel arms which can be elastically forced inwards, said parallel arms having second conical teeth projecting outwardly from their external ends which are able to engage an internal edge portion of said axial hole of said sleeve designed to receive the shaft of said pedal crank so as to permit free rotation thereof in said sleeve, and said sleeve having a length substantially equal to the distance between said second teeth of said second hollow shaft and the body of said pedal crank.

* * * * *